United States Patent
Lyman

(10) Patent No.: US 8,495,653 B2
(45) Date of Patent: Jul. 23, 2013

(54) SYSTEM AND METHOD FOR EVENT DRIVEN BROWSER LAUNCH

(75) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 1331 days.

(21) Appl. No.: 12/075,402

(22) Filed: Mar. 10, 2008

(65) Prior Publication Data

US 2008/0222656 A1    Sep. 11, 2008

Related U.S. Application Data

(60) Provisional application No. 60/906,024, filed on Mar. 9, 2007.

(51) Int. Cl.
*G06F 13/00* (2006.01)
(52) U.S. Cl.
USPC .......................................... 719/311; 719/318
(58) Field of Classification Search
USPC .................................... 719/311, 318
See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,104,711 A | 8/2000 | Voit | |
| 6,137,869 A | 10/2000 | Voit | |
| 6,282,574 B1 | 8/2001 | Voit | |
| 6,359,880 B1 | 3/2002 | Curry | |
| 6,389,132 B1 | 5/2002 | Price | |
| 6,400,719 B1 | 6/2002 | Chimura et al. | |
| 6,418,214 B1 | 7/2002 | Smythe et al. | |
| 6,430,275 B1 | 8/2002 | Voit | |
| 6,430,289 B1 | 8/2002 | Liffick | |
| 6,628,765 B1 | 9/2003 | Bangs et al. | |
| 6,718,030 B1 | 4/2004 | Turner et al. | |
| 6,820,083 B1 | 11/2004 | Nagy et al. | |
| 6,937,703 B1 | 8/2005 | Andreason | |
| 6,964,370 B1 | 11/2005 | Hagale et al. | |
| 7,007,074 B2 | 2/2006 | Radwin | |
| 7,031,442 B1 | 4/2006 | Neyman et al. | |

(Continued)

FOREIGN PATENT DOCUMENTS

| | | |
|---|---|---|
| WO | 2004049121 A2 | 6/2004 |
| WO | 2005036330 A2 | 4/2005 |
| WO | 2006020168 A2 | 2/2006 |

OTHER PUBLICATIONS

Inter-Tel, Inc. "Advanced Applications Design Guide for Contact Center Suite." Issue 1. Apr. 2006.

(Continued)

*Primary Examiner* — Andy Ho
(74) *Attorney, Agent, or Firm* — Carr & Ferrell LLP

(57) ABSTRACT

Systems and methods for providing event driven browser launch are provided. In exemplary embodiments one or more communication data variables associated with a communication are received. Browser launch settings for an individual associated with the communication are reviewed to determine a time to launch a browser. The browser may then be launched at the predetermined time. In exemplary embodiments, the browser provides data retrieved from a URL associated with at least one of the communication data variables.

20 Claims, 9 Drawing Sheets

U.S. PATENT DOCUMENTS

| | | |
|---|---|---|
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,274,781 B2 | 9/2007 | Lipton et al. |
| 7,333,976 B1 | 2/2008 | Auerbach et al. |
| 7,477,730 B2 | 1/2009 | Starbuck et al. |
| 7,496,185 B1 | 2/2009 | Primavesi et al. |
| 7,496,189 B2 | 2/2009 | Clarrisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,664,096 B2 | 2/2010 | Doherty et al. |
| 7,664,495 B1 | 2/2010 | Bonner et al. |
| 7,685,010 B2 * | 3/2010 | Goldberg et al. ............ 705/7.11 |
| 7,706,522 B2 | 4/2010 | Shaffer |
| 7,711,104 B1 | 5/2010 | Flockhart |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,131,872 B2 | 3/2012 | Kennedy et al. |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0078986 A1 | 4/2003 | Ayres et al. |
| 2003/0219029 A1 | 11/2003 | Pickett |
| 2003/0228010 A1 | 12/2003 | Clarrisse et al. |
| 2004/0039889 A1 | 2/2004 | Elder et al. |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 * | 5/2004 | Wick ........................... 709/207 |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gulser et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0201362 A1 | 9/2005 | Klein et al. |
| 2005/0209861 A1 * | 9/2005 | Hewes et al. ..................... 705/1 |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2010/0174807 A1 | 7/2010 | Lyman |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 * | 11/2010 | Sawada et al. ................ 715/751 |

OTHER PUBLICATIONS

"Enhanced Enterprise Communication: Transforming the bank into a proactive relationship center."

"Network Intelligence for Presence Enhanced Communication."

"Presence Aggregation in Endpoints."

Hull, et al., Enabling Context-Aware and Privacy-Conscious User Data Sharing, 2004, Proceedings of the 2004 IEEE International Conference on Mobile Data Management.

Broder, et al., Search Advertising Using Web Relevance Feedback, 2008, pp. 1013-1022, Conference on Information and Knowledge Management, Proceeding of the 17th AC conference on Information and Knowledge Management.

"What is Xact View?" Xact View User Guide, Schmooze Communications LLC 2008. www.schmooze.com.

* cited by examiner

SYSTEM AND METHOD FOR EVENT DRIVEN BROWSER LAUNCH

CROSS-REFERENCE TO RELATED APPLICATIONS

The present application claims priority benefit of U.S. Provisional Patent Application No. 60/906,024 filed Mar. 9, 2007, and entitled "Real-Time Call Management System," which is hereby incorporated by reference.

The present application is also related to U.S. patent application Ser. No. 11/827,314, filed Jul. 11, 2007 and entitled "System and Method for Centralized Presence Management of Local and Remote Users;" U.S. patent application Ser. No. 12/075,401, filed Mar. 10, 2008 and entitled "System and Method for Providing Single Click Enterprise Communication;" and U.S. patent application Ser. No. 12/075,411, filed Mar. 10, 2008 and entitled "System and Method for Distributed Communication Control within an Enterprise," which are also incorporated by reference.

BACKGROUND OF THE INVENTION

1. Field of the Invention

Embodiments of the present invention relate generally to communication systems and more particularly to providing event driven browser launch.

2. Description of Related Art

Detailed information regarding people is important in many situations. When a person calls into a call center, for example, information for the person may be helpful to an agent when addressing one or more concerns of the person. In some prior art systems, a customer relationship management (CRM) system may be accessed in order to obtain the person's information. However, often time the CRM system is not fully integrated with communication means. For example, an agent may have to manually access the CRM system and provide variables into various fields to access data. This may need to be performed while placing the person on hold.

Disadvantageously, these prior art systems are inconvenient and prone to errors. For example, if the agent enters a wrong variable (e.g., mistypes the persons name), incorrect or no data may be retrieved. Furthermore, there is a delay as manual entry is required. A further disadvantage is that these prior art systems may not allow for integration of external data searches or use of other internal data sources.

SUMMARY OF THE INVENTION

Embodiments of the present invention provide systems and methods for providing event driven browser launch. In exemplary embodiments, one or more communication data variables associated with a communication are received. For an inbound communication, the communication data variables may be detected by a communication server or by a communication data module of a gateway interface. In these embodiments, the communication data variables may be forwarded from the gateway interface to a client device associated with an individual who is the communication recipient. For outbound communications, the client device associated with the individual attempting to make the outbound communication may detect the communication data variable.

Browser launch settings for the individual are reviewed to determine when to launch a browser. Besides indicating when to launch, the browser launch settings may also indicate display options and URLs to access data based on the communication data variables. In some embodiments, a policy (e.g., enterprise-wide policy) may override one or more settings of the browser launch settings.

The browser may then be launched at the determined time. In exemplary embodiments, the browser provides data retrieved from one or more URLs associated with at least one of the communication data variables.

DETAILED DESCRIPTION OF EXEMPLARY EMBODIMENTS

Embodiments of the present invention provide systems and methods for providing event driver browser launch. In exemplary embodiments, a browser may be launched in association with an inbound or outbound communication. The browser may be launched at any time before, during, or after the communication. Exemplary embodiments will be discussed in connection with an enterprise. It should be noted that enterprise as applied herein may comprise any type of organization or collection of individuals. Examples of enterprises may include a business, educational institution, firm, or any other type of entity whereby a group of individuals may be centrally organized and working from a central office or from regional offices or from home or the road.

Figure 1:
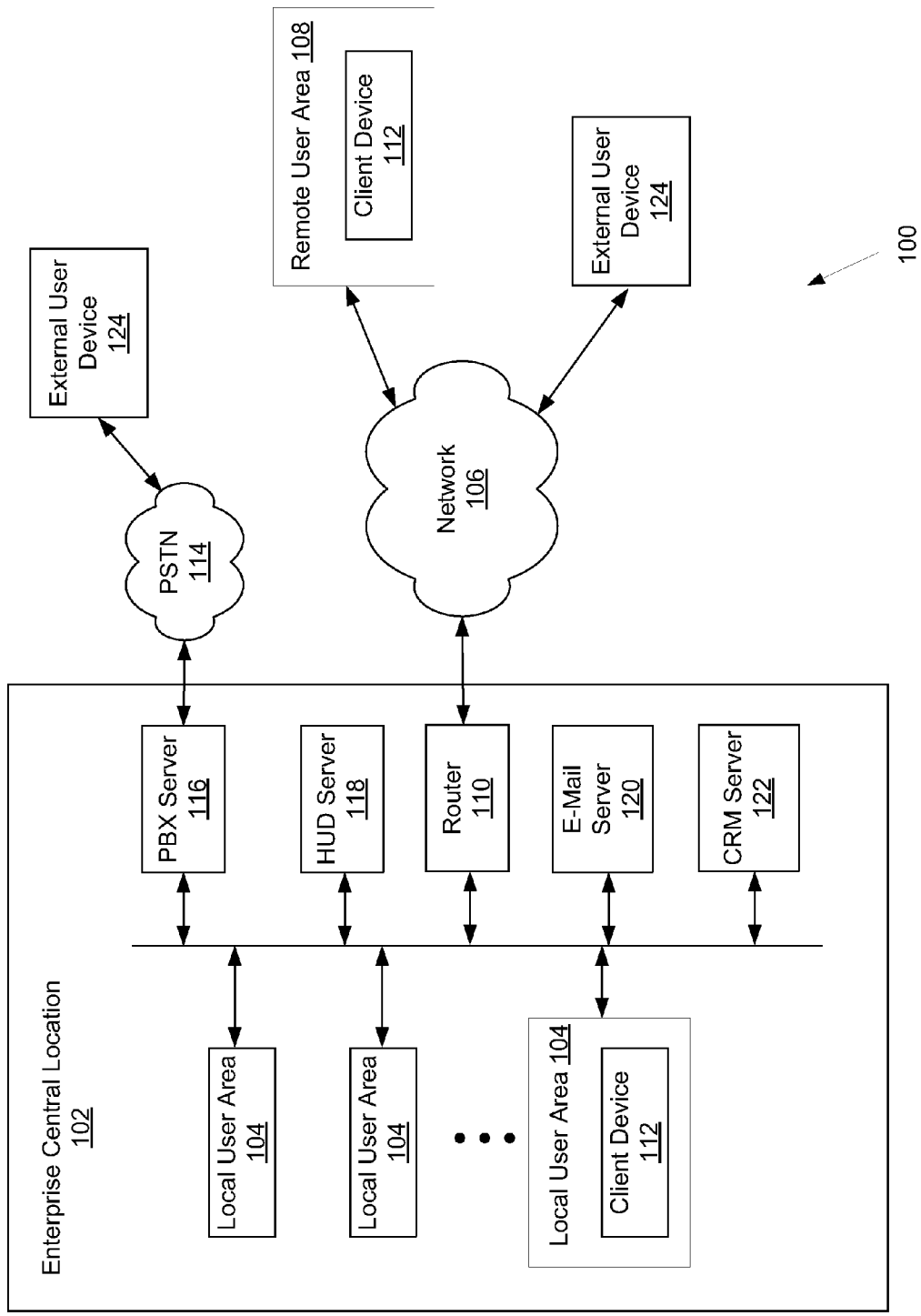
FIG. 1 is a diagram of an exemplary environment in which embodiments of the present invention may be practiced.

FIG. 1 shows an exemplary environment 100 in which embodiments of the present invention may be practiced. The exemplary environment 100 comprises an enterprise central location 102 which includes a plurality of local user areas 104. The enterprise central location 102 may be, for example, a main office and the local user areas 104 may include individual offices and/or cubicles. Each local user area 104 may be associated with an individual. It should be noted that any number of local user areas 104 may be provided within the enterprise central location 102. It should also be noted that more than one enterprise central location may be coupled via a network 106 to provide embodiments of the present invention.

The network 106 may comprise the Internet or any other wide area network. In some embodiments, the network 106 may couple the enterprise central location 102 to one or more remote user areas 108 via a router 110 or gateway. The remote user area 108 may be a location associated with an individual that remotely accesses the enterprise central location 102. For example, the remote user area 108 may be a home office of an employee associated with the enterprise central location 102. The remote user area 108 may comprises a client device 112 (e.g., a computer), which may function as a communication device. One or more additional communication devices (e.g., analog telephone, VoIP device, cellular phone, laptop) may also be provided in the remote user area 108. Any number of remote user areas 108 may be coupled to the enterprise central location 102. Additionally, it should be noted that "remote" as used herein refers to any environment external to the enterprise central location 102.

According to exemplary embodiments, the individuals within both the enterprise central location 102 and the remote user areas 108 may exchange communications via the network 106. For example, the individual may receive an e-mail or instant message which may be forwarded via the network 106. In other embodiments, the individual may receive or place phone calls using any telephony device (e.g., desk phone, VoIP device, cellular phone). The phone call may be placed by using the network 106 (e.g., for a VoIP device) or placed via a public switch telephone network (PSTN) 114 (e.g., for an analog phone).

The enterprise central location 102 may comprise a plurality of local user areas 104 coupled to the router 110, a PBX server 116, a heads-up display (HUD) server 118, an e-mail server 120, and a customer relationship management (CRM) server 122 via a local area network (LAN).

Each local user area 104 may also comprise the client device 112. In exemplary embodiments, the client device 112 may comprise a desktop computer, laptop, or any other digital communication device enabled to provide a communications user interface, such as the user interface that will be discussed in connection with FIG. 4a. The exemplary client device 112, itself, is configured to be a communication device. As such, the client device 112 may be configured to provide e-mail, instant messaging (e.g., chat), VoIP, or any other communication types. The client device 112 will be discussed in more detail in connection with FIG. 3.

It should be noted that other communication devices may be present in the local user area 104 and/or remote user area 108. These communication devices may comprise a device separate from the client device 112 but associated with the individual, such as for example, an analog telephone or cellular phone.

In accordance with one embodiment, the enterprise central location 102 is coupled in communication via the router 110 to the network 106 and via the PBX server 116 to the PSTN 114. The PBX server 116 is configured to allow the client device 112 and/or other communications devices to place or receive phone calls via the PSTN 114. In some embodiments, the PBX server 116 may be an IP-PBX server capable of serving VOIP communications.

The HUD server 118 is configured to manage communications and provide a gateway interface to other servers of the enterprise central location 102. In exemplary embodiments, the HUD server 118 manages the event drive browser launch at a server level. In some embodiments, the HUD server 118 may also allow customization of the browser launch mechanism. The HUD server 118 will be discussed in more details in connection with FIG. 2.

One or more other communication servers may also be provided within the enterprise central location 102. These communication servers may establish, maintain, and/or facilitate communications between individuals. In the present embodiment, communication servers shown include the PBX server 116 and the e-mail server 120. The communication servers may also include, for example, a chat server or any other server configured to facilitate communication exchange.

The exemplary CRM server 122 provides customer relationship management functionality. In exemplary embodiments, the CRM server 122 may capture data, store and analyze data on customers, vendors, and partners, and generally process internal data. The captured and processed data may be stored in a CRM database of the CRM server 122 or be otherwise coupled thereto, and accessed by individuals of the enterprise. CRM as herein referred to may be directed to any contact management system.

In exemplary embodiments, each interaction with a customer, vendor, or other external user associated with an external user device 124 may be added to an external user's contact history. The individuals associated with the enterprise may then retrieve information on these external users from the CRM database when necessary. One of the benefits of this contact history is that external users can interact with different individuals or different contact channels in the enterprise over time without having to describe the history of their interaction each time. Another benefit is that the individuals of the enterprise have consistent, available information for the external users that have contact histories or other data stored in the CRM database. Thus, for example, an enterprise comprising a call center may utilize the CRM server 122 to support their call center agents.

It should be noted that the environment 100 of FIG. 1 is exemplary. Alternative embodiments may comprise any number of enterprise central locations 102, remote user areas 108, client devices 112, and communication devices.

Figure 2:
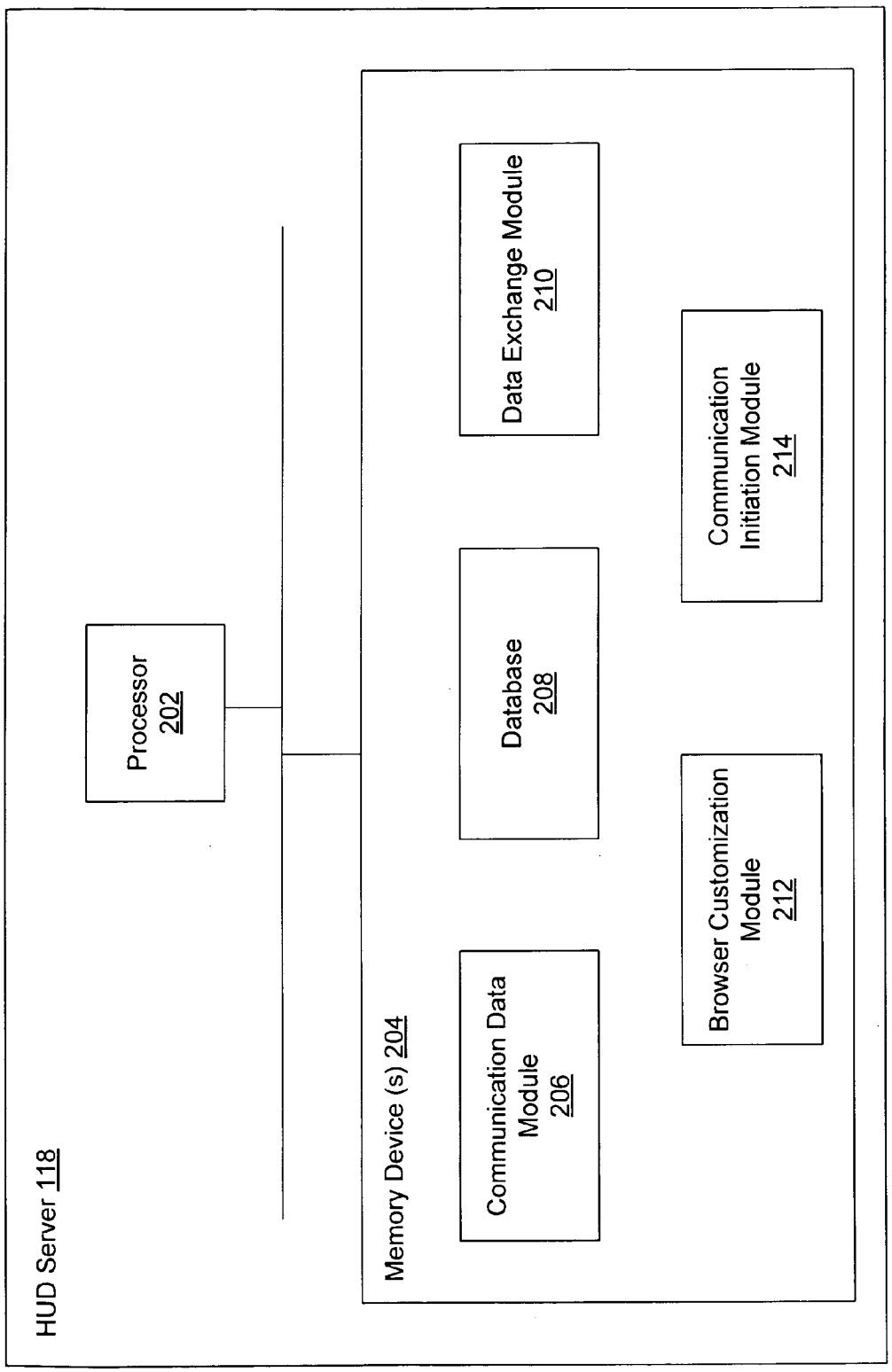
FIG. 2 is a block diagram of an exemplary HUD server.

Referring now to FIG. 2, the exemplary HUD server 118 is shown in more detail. The HUD server 118 comprises a processor 202 and one or more memory devices 204 (also referred to as a storage medium). The memory device(s) 204 may comprise a communication data module 206, a database 208, a data exchange module 210, a browser customization module 212, and a communication initiation module 214. The HUD server 118 may comprise other components not directly related to functionality of embodiments of the present invention, such as a presence module and a chat engine. As such, alternative embodiments of the HUD server 118 may comprise more, less, or functionally equivalent components.

The exemplary communication data module 206 is configured to manage and exchange communication data variables. In exemplary embodiments, the communication data variables comprise details of a communication such as, for example, a contact identifier (e.g., phone number and e-mail address), contact name, type of communication (e.g., queue call, internal communication, and outbound communication), and duration of communication. In some embodiments, the type of communication may be determined based on how the communication navigates through the communication server or system (e.g., press "1" for support; press "2" for sales, etc.).

In exemplary embodiments, the communication data variables may be automatically determined by the communication server receiving the communication and passed to the communication data module 206, which may then pass the communication data to the appropriate client device 112. For example, an inbound phone call from the external user device 124 is received by the PBX server 116. The PBX server 116 may automatically detect one or more communication data variables (e.g., call identifier number or phone number, call ID name, and type of call). The communication data variables are passed to the communication data module 206. In some embodiments, the communication data module 206 may then forward the communication data variables to the appropriate client device 112 of the individual/agent that should receive the inbound communication. It should be noted that substantially simultaneously with the passing of the communication data variables to the HUD server 118, the PBX server 116 may route the phone call to the communication device (e.g., client device 112) of the individual/agent. As such, essentially parallel data streams—one for communication (from the PBX server 116) and one with data regarding the communication (from the HUD server 118)—are being sent to the client device 112.

In exemplary embodiments, the appropriate client device 112 to forward communication data variables to is determined based on a review of the database 208. The database 208 may comprise tables identifying data associated with individuals and their corresponding client devices 112 and communication devices. For example, the database 208 may indicate an internal IP address for the client device 112 that should receive communication data variables received by the communication data module 206.

Once the appropriate client device 112 is determined, the communication data module 206 may pass the communication data variables to the client device 112. Other related data may also be passed to the client device 112. The passing of the communication data variables may, in some embodiments, trigger the launch of a browser on the client device 112 as will be discussed in more details below.

The exemplary data exchange module 210 is configured to provide access to information used to populate one or more windows of the event driven browser. In some embodiments, the data exchange module 210 accesses the CRM server 122 to obtain and provide contact histories and other contact data relevant to the communication to the client device 112. In other embodiments, the data exchange module 210 may provide access to other internal servers or system, such as a billing system. For example, upon completion of a communication, a browser on the client device 112 may be launched depicting a ticketing/billing system which includes call metrics (e.g., duration of call). The resulting browser page may be reviewed and/or submitted in various embodiments to cause billing for the communication (e.g., billing for number of minutes on an IT support call).

The exemplary browser customization module 212 is configured to allow an administrator or other authorized individual of the enterprise to customize browser launch and data exchange functions at a server level. In exemplary embodiments, the browser customization module 212 may allow the administrator to set up use of custom communication data variables at the server level, which can then be passed through the HUD server 118 to the browser. For example, there may be a desire for an external user to enter a ticket number such that when an agent picks up a phone call, the browser supplies information associated with that entered ticket number; the browser customization module 212 allows for the creation of this custom communication data variable (i.e., ticket number) and corresponding fields. The custom communication data variables may then be passed to the client device 112 to trigger the browser launch as will be discussed in more detail below.

In an alternative embodiment, the browser customization module 212 may be provided in a PBX layer at the PBX server 116. In this embodiment, the browser customization module 212 may comprise an API to which custom communication data variables may be written. Similar customization modules may be provided in other communication servers.

It should be noted that the custom variable may be set to any data, functionality, or combination of data and/or functionality. For example, ten different pieces of data and functionality may be combined into one variable and assigned a particular variable name. As long as the variable name is set, the variable may be used in the browser.

The exemplary communication initiation module 214 is configured to initiate a communication based on a communication request received from the client device 112. In one example, the client device 112 transmits a communication request to the HUD server 118 to make a phone/VOIP call to another device. Once the communication request is received, the communication initiation module 214 sends instructions to appropriate modules or servers to establish a communication of a selected communication type. For example, the communication initiation module 214 may send instructions to the PBX server 116 to establish a phone call to an external user at the external user device 124. Alternatively, the communication initiation module 214 may send instructions to a chat server or chat module to establish a chat communication between two individuals. In some embodiments, communication modules may be embodied within the HUD server 118 (e.g., a chat module may be present in the HUD server 118).

Figure 3:
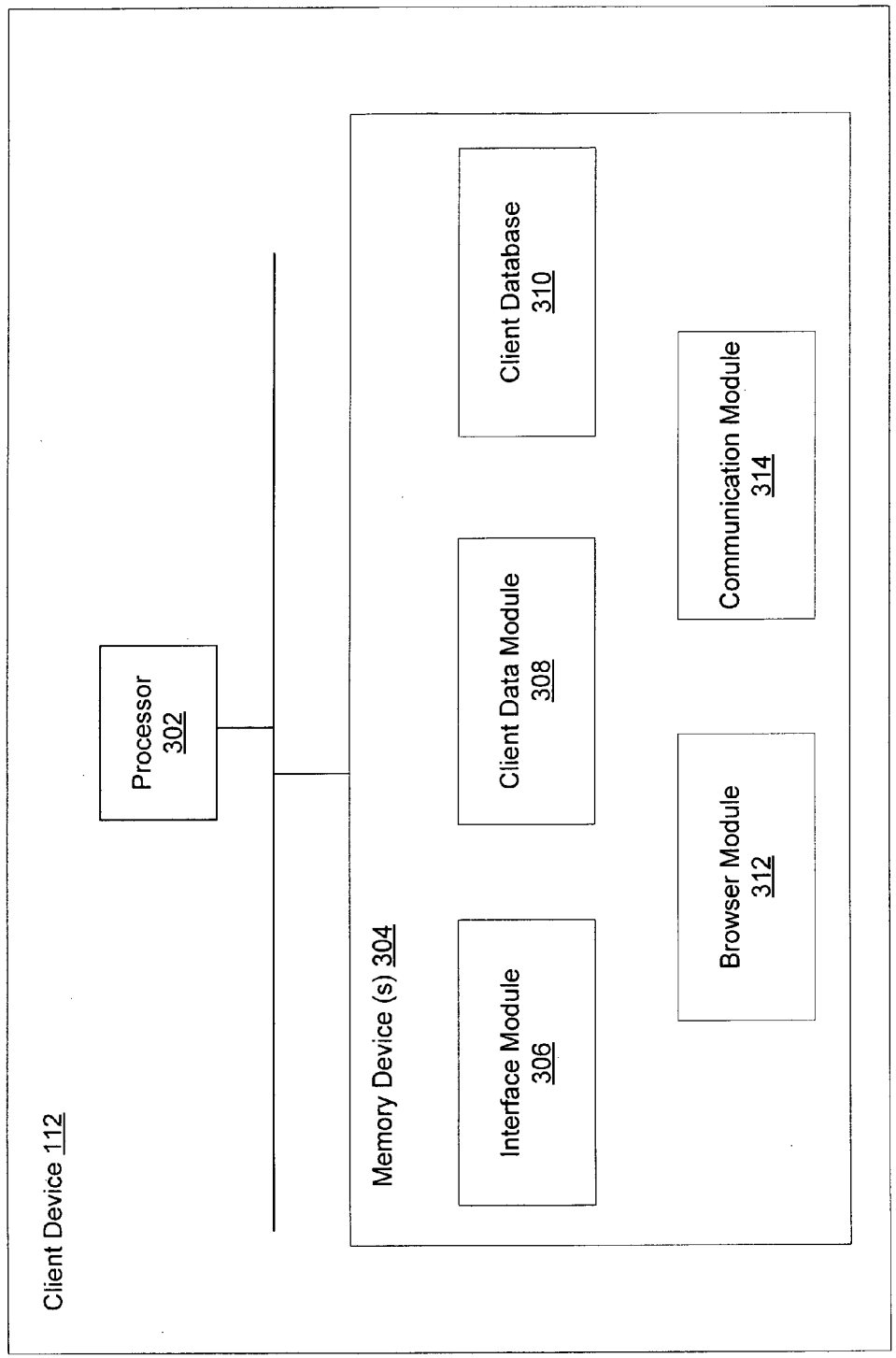
FIG. 3 is a block diagram of an exemplary client device on which embodiments of the present invention may be practiced.

The exemplary client device 112 is shown in FIG. 3. The client device 112 comprises a processor 302 and one or more memory devices 304 (also referred to as a storage medium). The memory device(s) 304 may comprise an interface module 306, a client data module 308, a client database 310, a browser module 312, and a communication module 314. The client device 112 may comprise other components not directly related to functionality of embodiments of the present invention, and thus are not shown or discussed.

The exemplary interface module 306 is configured to provide a user interface that allows for communication establishment and status. In exemplary embodiments, the interface module 306 will receive and display data from the HUD server 118 (or other server devices) and from the client device 112. For example, presence status data may be received from the HUD server 118 and displayed in the user interface. An example of the user interface is shown and will be discussed in more detail in connection with FIG. 4a.

In some embodiments, the interface module 306 may also provide access to a browser launch settings interface. An individual may customize aspects of the browser launch via this settings interface. For example, the individual may determine when to launch the browser, display options for the browser, and what type of browser page or window to launch. An example of the browser launch settings interface is shown, and will be discussed in more detail, in FIG. 4b. In one example, the interface module 306 may launch a user interface such as a browser (e.g., Microsoft Internet Explorer or Mozilla Firefox) that is resident on the client device 112. The browser is then directed to a webpage that displays data from the client device 112 or the HUD server 118 (or other server devices).

In exemplary embodiments, the client data module 308 is configured to receive communication data variables from the communication data module 206 of the HUD server 118. The client data module 308 may receive the communication data variables from the HUD server 118 immediately when the communication data variables become available to the HUD server 118. For example, an inbound phone call to the PBX server 116 will trigger the PBX server 116 to provide communication data variables to the communication data module 206 of the HUD server 118. The communication data variables may then be immediately forwarded to the client data module 308. Substantially simultaneously, the PBX server 116 may route the inbound phone call to the client device 112 or another communication device associated with the same individual. In some embodiments, the receipt of the communication data variables may trigger a review of the browser launch settings to determine when, where, and what type of browser page to launch. In alternative embodiments, other notifications of inbound communication may trigger the review (e.g., receipt of inbound communication from the communication server).

In embodiments where the client device 112 initiates an outbound communication, the client data module 308 may be configured to detect the communication data variable(s) for the outbound communication. For example, an individual associated with the client device 112 may initiate a phone call to an external user at the external user device 124. Based on the phone number, the client data module 308 may detect corresponding communication data variables such as customer name and account number. In some embodiments, external user data may be locally stored in the client database 310 (e.g., Outlook contacts data). For example, a contacts table may be maintained in the client database 310 which includes communication data variables (e.g., phone numbers, e-mails, name, and addresses) for frequently contacted external users.

The client database 310 may further store the browser launch settings. The browser launch settings may include, for example, instructions as to when to launch a browser (e.g., before or at the beginning of a communication, during a communication, upon completion of the communication, or any combination thereof), display options, and URL used to obtain data for the browser. An example of a browser launch settings interface is shown and described in more detail in connection with FIG. 4b.

The browser module 312 is configured to launch a browser. In some embodiments, the browser module 312 may receive launch instructions from the client data module 308 at a predetermined time. The browser may be directed to a specific webpage or be directed to a webpage containing a window or frame directed to a URL that is constructed based on, or otherwise is associated with, one or more of the communication data variables. In some embodiments, the browser is directed to internal information via an internal URL. In these embodiments, the browser module 312 may communicate with the data exchange module 210 to access internal (e.g., within the enterprise central location 102) servers and databases, such as the CRM server 122. In other embodiments, the browser is directed to external information (e.g., information accessed via the network 106) via an external URL. In these embodiments, the browser module 312 may access the network 106 to construct a page containing the external information. For example, an external URL to Google.com may be constructed from one or more communication data variables applied to a Google URL (e.g., Google. com%%callerID_number will provide a Google search of the caller ID number). In other embodiments, the URL may "call" a remote server in the background passing it variables. In this embodiment, the call may be hidden to the individual and the communication with the remote server may be background/covert.

The exemplary communication module 314 is configured to initiate a communication. In some embodiments, the communication module 314 may send a communication request comprising a contact identifier to the HUD server 118 or other communication server to initiate an outbound communication. For example, a communication request may be forwarded to the HUD server 118 and the communication initiation module 214 may then instruct the PBX server 116 to establish a phone call. In other embodiments, the communication module 314 may send instructions to a local module of the client device 112 to initiate the outbound communication. For example, the communication module 314 may instruct an e-mail module of the client device 112 to provide a new e-mail composition window. The communication module 314 may also receive and establish an inbound communication.

Figure 4A:
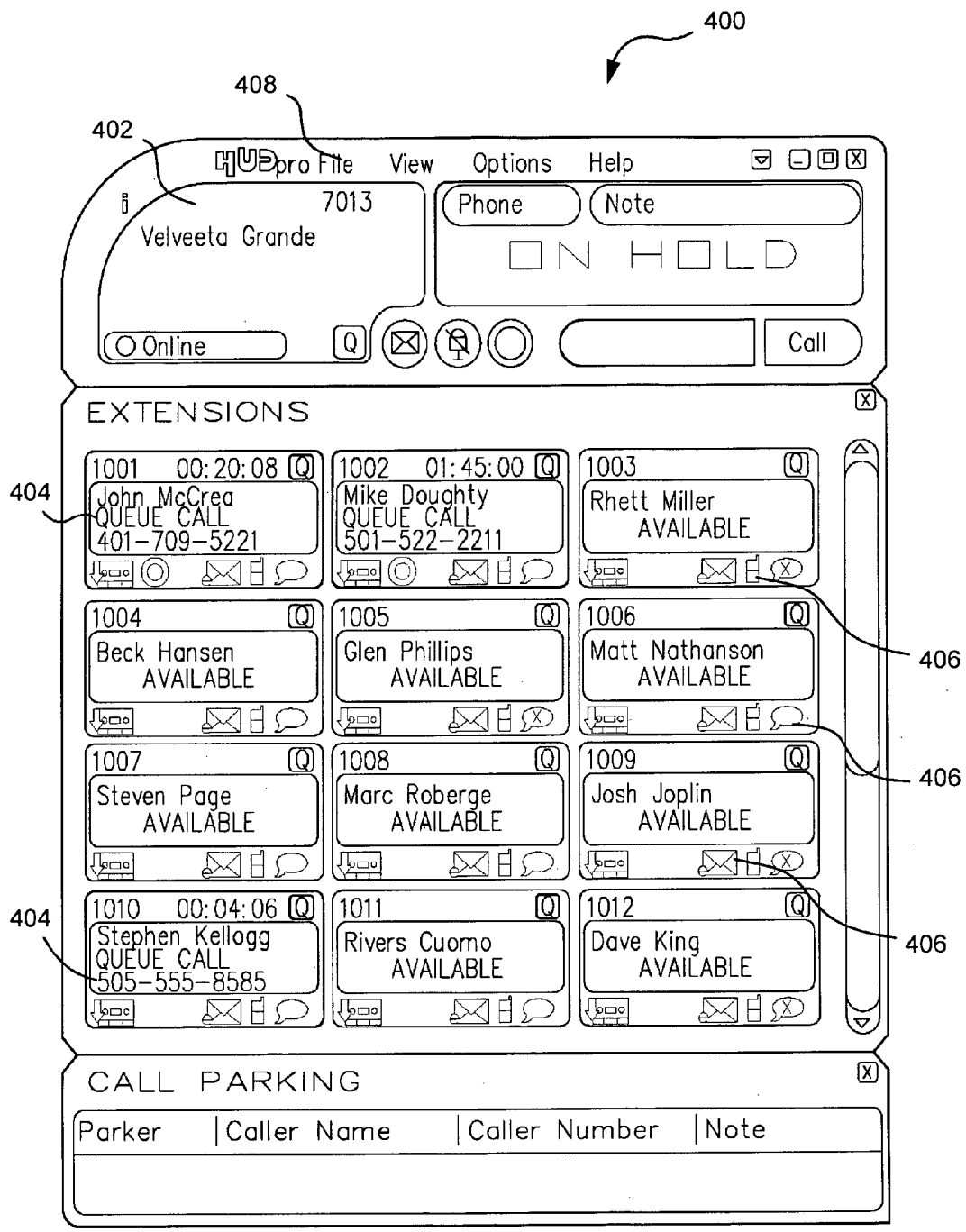
FIG. 4a is an example of a user interface for enabling enterprise communication.

Referring now to FIG. 4a, an example of a user interface 400 configured to provide event driven browser launch is shown. The exemplary user interface 400 displays individuals within the enterprise and their availability, various communication types available, and the present individual's status. In the present example, the user (i.e., individual using the user interface 400) is identified by name and extension in a top, left display section 402. Local and remote individuals of the enterprise are displayed in a lower portion of the user interface 400, and may be identified by name and extension within a display block 404. The local and remote individuals may be organized in any manner, such as by first name, last name, extension number, team (e.g., sales teams, executive team) or group, and so forth.

Within each block 404, a plurality of icons 406 may be provided to indicate availability and provide single-click communication functionality. The icons 406 may comprise, for example, an e-mail icon, a cellular/mobile phone icon, phone icon, voicemail icon, and a chat icon. In some embodiments, the user may initiate a phone call or a direct-to-voicemail by clicking on an extension number within the block 404 or by clicking on the individual's name within the block 404. Status of the local and remote individuals may also be received from the HUD server 118 and displayed in each block 404.

Figure 4B:
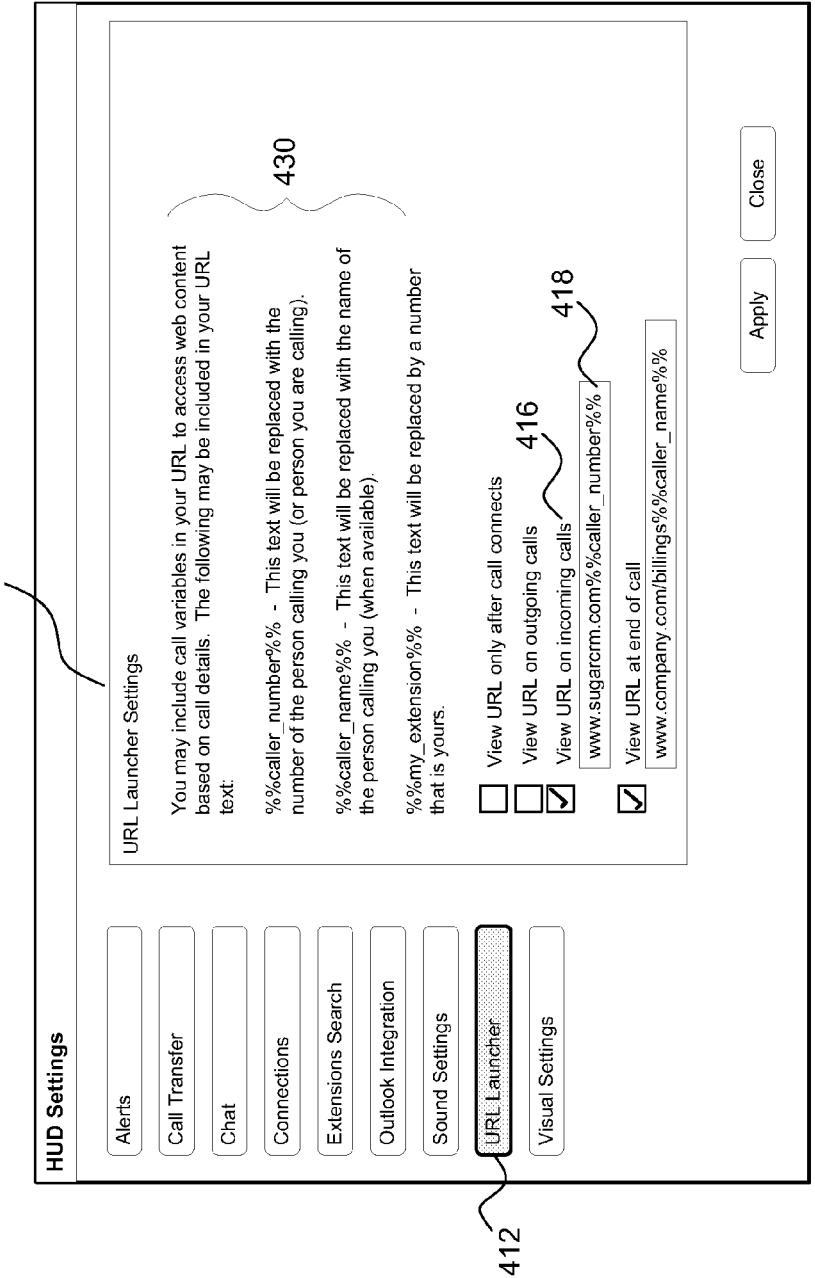
FIG. 4b is an example of a browser launch settings interface.

The user interface 400 may also provide access to the browser launch setting interface. In one embodiment, the individual may customize interface settings via selecting a file menu 408 and choosing a HUD setting option. Upon selecting the HUD setting option, a HUD settings interface 410 as shown in FIG. 4b may be displayed. The HUD settings interface 410 allows the individual to customize settings for various functions.

In the present embodiment, a URL launcher button 412 has been selected which provides a URL launcher settings window 414. The exemplary URL launcher settings window 414 may provide data access options 416 which indicate when the browser should be launched and provides the URL to the browser upon launch via a URL field 418. Any one or more of the data access options 416 may be selected (e.g., highlighted, box checked, etc.). In one embodiment, the individual may be enabled to enter in the URL field the URL to access for the selected data access option 416. For example, the URL field 418 may provide a URL that is "www.crm. com%%caller_name%%," whereby "caller_name" is replaced in the browser by the name of the person calling or being called (i.e., communication data variable). It should be noted that the data access option 416 may be directed to internal data sources (e.g., CRM server 122), external/network data sources (e.g., search engines), or a combination of both.

The URL launcher settings window 414 may also provide instructions 430. These instructions 430 provide sample URL entries and other instructions for establishing the browser launch settings.

In some embodiments, combinations of data access options 416 and URL field 418 may be set. For example, upon receipt of an inbound communication (i.e., "View URL on inbound calls" data access option 416), an entry in the URL field 418 may comprise "www.crm.com%%caller_number%%." This may launch a browser having a page with data based on the caller number. Upon completion of the call (i.e., "View URL at end of call" data access option 416), an entry in the URL field 418 may be directed to a billing system page using the caller number as the communication data variable. This may then launch a billing page on the browser. As such, any combination of data access options 416 and URL field 418 entries may be used.

In some embodiments, more than one URL field 418 entry may be associated with the data access option 416. For example, a URL field 418 entry may direct browser access to the CRM server 122. However, in the event that there is no data result, a secondary data URL field 418 entry may be triggered. Thus, for example, the secondary URL field 418 entry may direct browser access to a search engine on the network 106.

It should be noted that in some embodiments, an overriding policy may be implement that may trump one or more of the browser launch settings or establish default settings in the browser launch settings. Thus, for example, an administrator may set an enterprise policy that forces a browser to launch to connect to a billing system upon completion of every queue call. It should also be noted that further data access options 416 and URL fields 418 may be provided in the HUD settings interface 410 for other communication types (e.g., e-mail and chat). Any number of data access options 416 and URL fields 418 may be provided in exemplary embodiments.

Figure 4C:
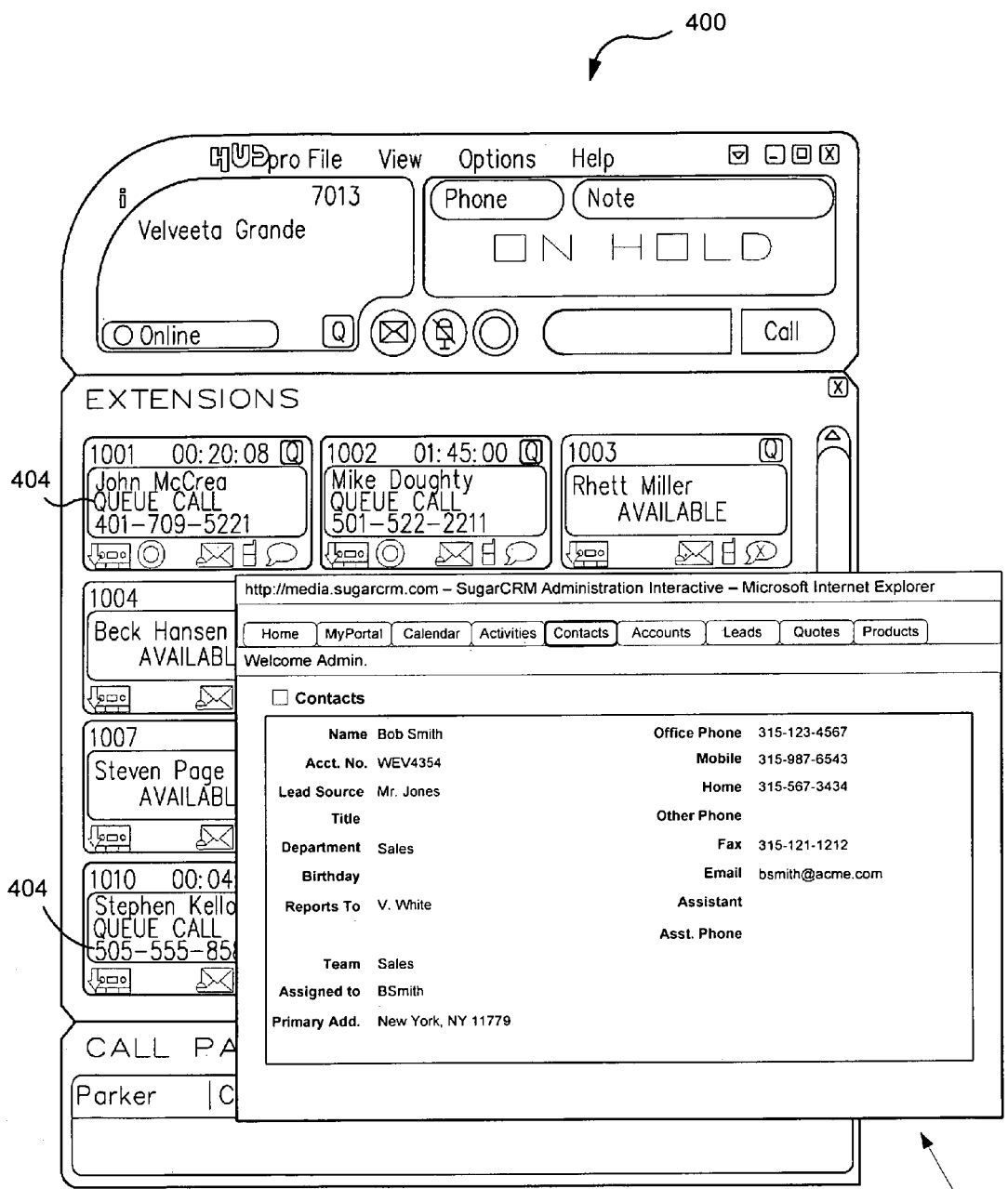
FIG. 4c is an example of a launched browser.

Referring now to FIG. 4c, an example of a launched browser window 420 is shown. In the present embodiment, the browser window 420 may be launched overlapping the user interface 400. It should be noted that the browser window 420 may be launched anywhere on a display device of the individual. The browser window 420 of FIG. 4c is launched with a browser page directed to the CRM server 122. The browser page may be launched based on the caller name, caller phone number, e-mail address, or any other communication data variable. In exemplary embodiments, the fields of the browser page are populated with information obtained from the CRM server 122. In other embodiments, some of the fields may be populated with information that is already known by the client device 112 (e.g., communication data variables received from the HUD server 118).

Figure 5:
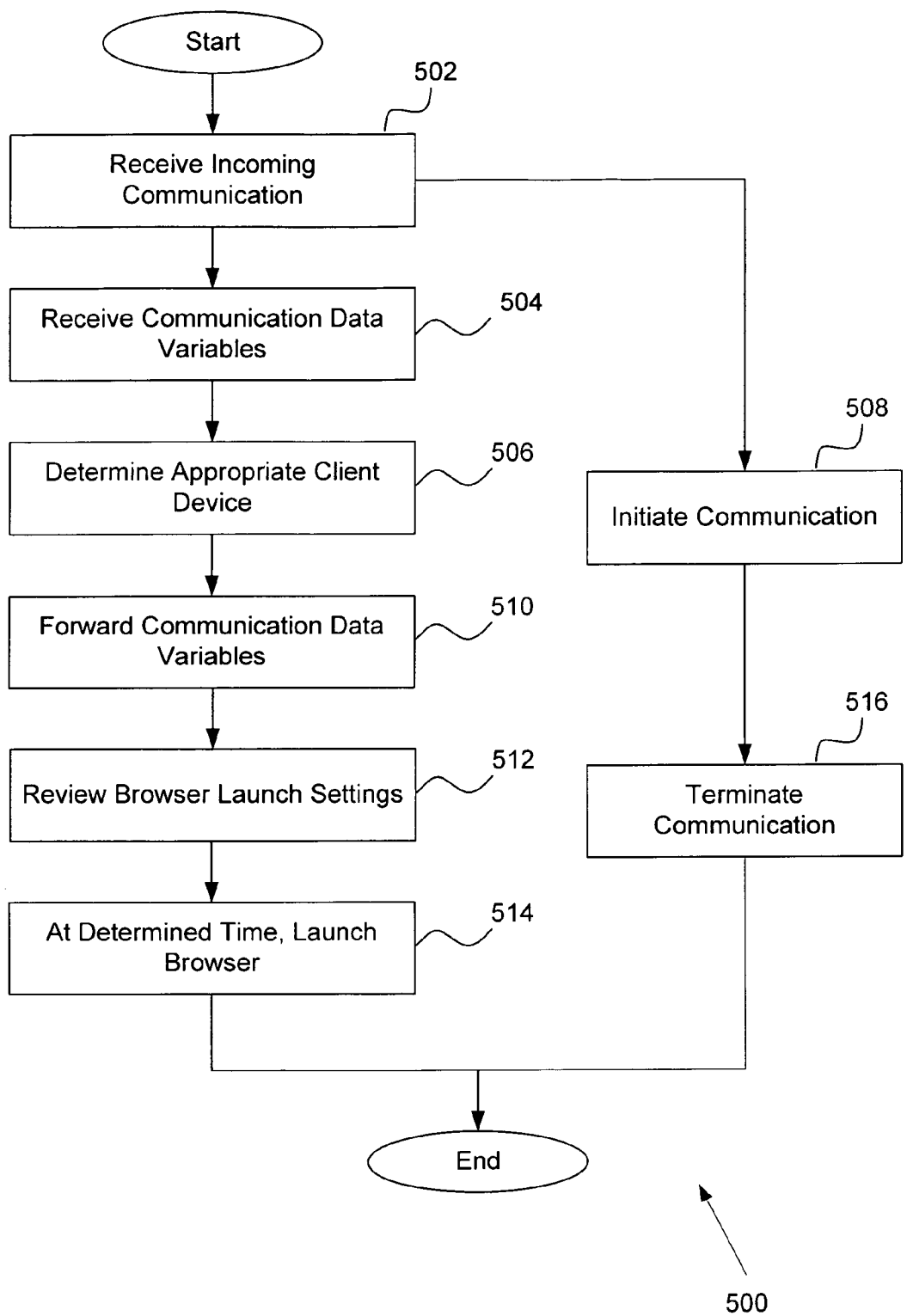
FIG. 5 is a flowchart of an exemplary method for launching a browser for an inbound communication.

Referring now to FIG. 5, a flowchart 500 of an exemplary method for browser launch during an inbound communication is provided. Inbound communication as used herein refers to any communication that is being received by an individual (i.e., intended recipient) located at the local or remote user area 104 or 108. In step 502, the inbound communication from an external user associated with an external user device 124 is received by a communication server associated with the enterprise central location 102. The communication servers may include, for example, a PXB server 116 or an e-mail server 120. It should be noted that in some embodiments, the inbound communication may be from another individual associated with the enterprise central location 102 (e.g., from a remote user area 108).

Communication data variables are then received by the HUD server 118 in step 504. In exemplary embodiments, communication data variables are associated with the inbound communication. These communication data variables may include data such as name or phone number of a caller, e-mail address of a sender, phone number or e-mail address of a recipient, and type of communication (e.g., queue call, inbound call, etc.). In some embodiments, the communication server receiving the inbound communication will detect the communication data variables and forward the communication data variables to the HUD server 118. For example, an incoming phone call will be received by the PBX server 116. The PBX server 116 will detect one or more communication data variables, such as caller identifier number and caller identifier name. These communication data variables are then forwarded to the communication data module 206 of the HUD server 118.

In step 506, a determination is made as to which individual associated with the enterprise central location 102 should receive the inbound communication. In some embodiments, the inbound communication may specify a particular individual (e.g., direct phone number or e-mail address). In other embodiments, the inbound communication may be directed to a particular group of individuals (e.g., support group, sales group). In these embodiments, the communication data module 206 may review the associated communication data variables and determine, based on information stored in the database 208 in conjunction with availability statuses of individuals, which individual should receive the inbound communication. The result may be returned to the communication server along with routing instructions. In other embodiments, the communication server, itself, may determine to which individual to route the inbound communication.

The communication server attempts to initiate the communication with the intended recipient in step 508. In exemplary embodiments, the communication server may route the inbound communication to a communication device of the intended recipient. In some embodiments, a notification of the inbound communication is provided to the intended recipient and the intended recipient may chose to accept the inbound communication (e.g., answer a phone call) or respond to the inbound communication (e.g., review an e-mail). For example, a phone call may be routed to a desk phone or VoIP enabled device of an individual at the local user area 104. The routing may be based, in some embodiments, on the determination in step 506.

Substantially simultaneously with the communication initiation (step 508), the communication data variables are forwarded to the client device 112 of the intended recipient in step 510. The communication data variables may be received by the client data module 308 of the client device 112.

The receipt of the communication data variable and/or the notification of an inbound communication may trigger a review of the browser launch settings in step 512. In some embodiments, the client data module 308 may access the client database 310 to review defined browser launch settings. These browser launch settings may indicate, for example, when to launch the browser, display options, and what URL to use to obtain a browser page for display in the browser.

At a predetermined launch time, the browser will be launched in step 514. In various embodiments, the browser may be automatically launched by the browser module 312 upon notification of the communication, after initiating the communication (step 508), or upon completion of the communication (step 516). In some embodiments, the individual may also manually trigger a browser at any before, during, upon completion of the communication.

In step 516, the communication is completed. Thus, for example, a phone call be finished and the intended recipient hangs up on the call. As discussed above, in some embodiments, the browser may be launched upon completion of the inbound communication. As such, the steps in FIG. 5 may be practiced in a different order than that described above.

Figure 6:
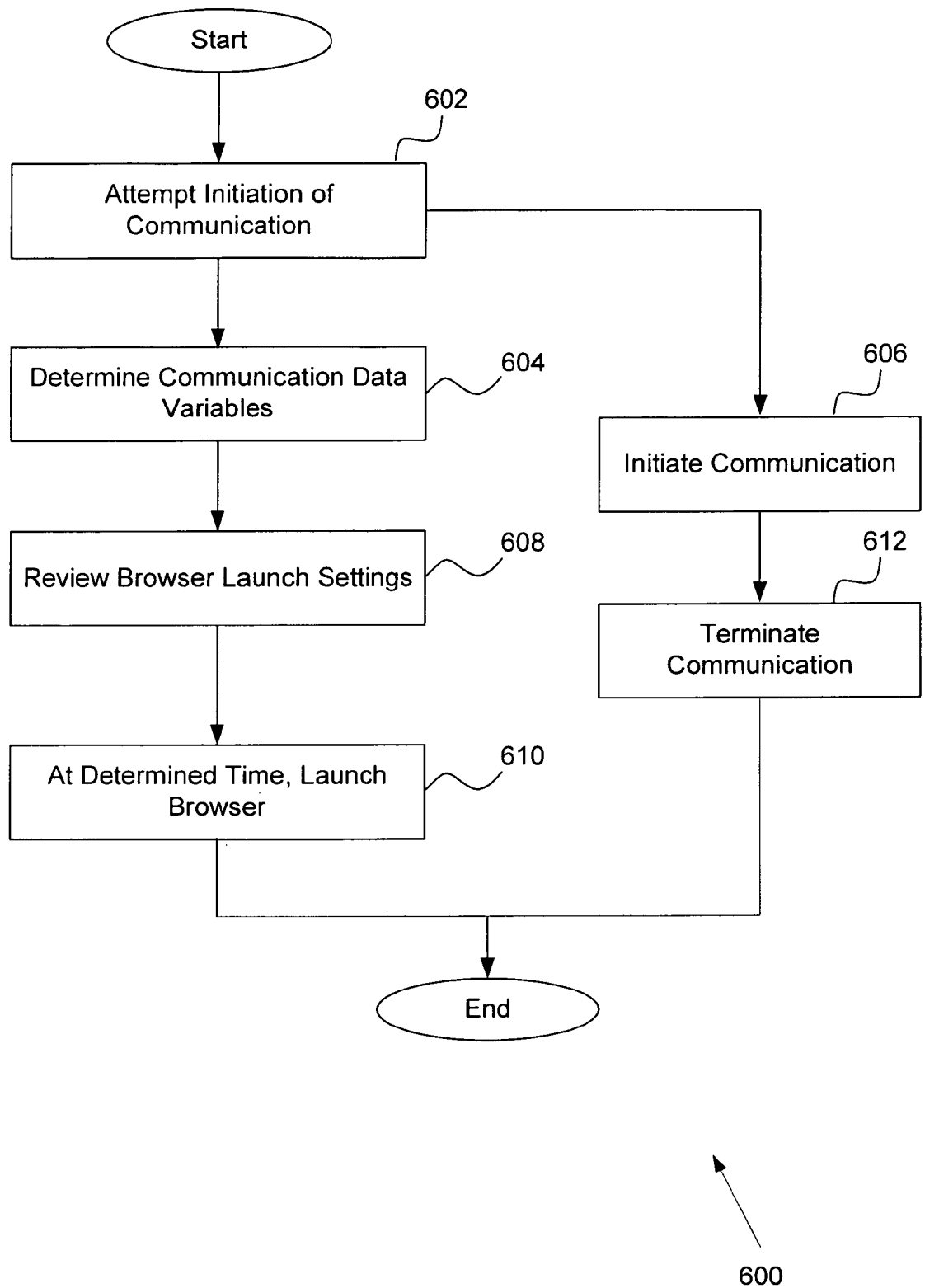
FIG. 6 is a flowchart of an exemplary method for launching a browser for an outbound communication.

Referring now to FIG. 6, an exemplary flowchart 600 for browser launch during an outbound communication is provided. Outbound communication as used herein refers to any communication that is being requested by an individual located at the local or remote user area 104 or 108. The embodiment of FIG. 6 provides for browser launch without any input from the HUD server 118

In step 602, initiation of an outbound communication is attempted. The outbound communication may be directed to an external user associated with the external user device 124. In accordance with some embodiments, a communication request is sent from a communication device (e.g., client device 112) associated with the individual. The communication request may specify an intended communication recipient and corresponding contact information (e.g., phone number, e-mail address). The communication request may be received by the communication initiation module 214 of the HUD server 118. The communication initiation module 214 then forwards routing instructions to the appropriate communication server. It should be noted that in some embodiments, the outbound communication may be directed to another individual associated with the enterprise central location 102 (e.g., to a remote user area 108).

Communication data variables are detected in step 604. In exemplary embodiments, the client data module 308 detects the communication data variables associated with the outbound communication. Because the client device 112 is attempting to initiate the communication, some of the communication data variables are easily detectable as these variables are part of a communication request (e.g., name or phone number of recipient, e-mail address of a recipient).

Prior to, substantially simultaneously with, or after the determination of the communication data variables (step 604), the communication server attempts to initiate the communication with the intended recipient in step 606. In exemplary embodiments, the communication server may route the outbound communication to a network (e.g., network 106 or PSTN 114), which then routes the communication to the intended recipient.

Based on the communication data variables, a review of the browser launch settings is performed in step 608. In some embodiments, the client data module 308 may access the client database 310 to review defined browser launch settings. These browser launch settings may indicate, for example, when to launch the browser, display options, and what URL to use to obtain a browser page for display in the browser.

At a predetermined launch time, the browser will be launched in step 610. In various embodiments, the browser may be automatically launched by the browser module 312 upon the attempt to initiate the communication (step 602), after initiating the communication (step 606), or upon completion of the communication (step 612). In some embodiments, the individual may also manually trigger a browser at any before, during, upon completion of the communication.

In step 612, the communication is completed. Thus, for example, a phone call be finished and the intended recipient hangs up on the call. As discussed above, in some embodiments, the browser may be launched upon completion of the inbound communication. As such, the steps in FIG. 6 may be practiced in a different order than that described above.

It should be noted that the methods of FIG. 5 and FIG. 6 are exemplary. Alternative embodiments may contemplate different steps, combination of steps, or different order to the steps. Furthermore, more than one browser window may be launched during the communication.

Figure 7:
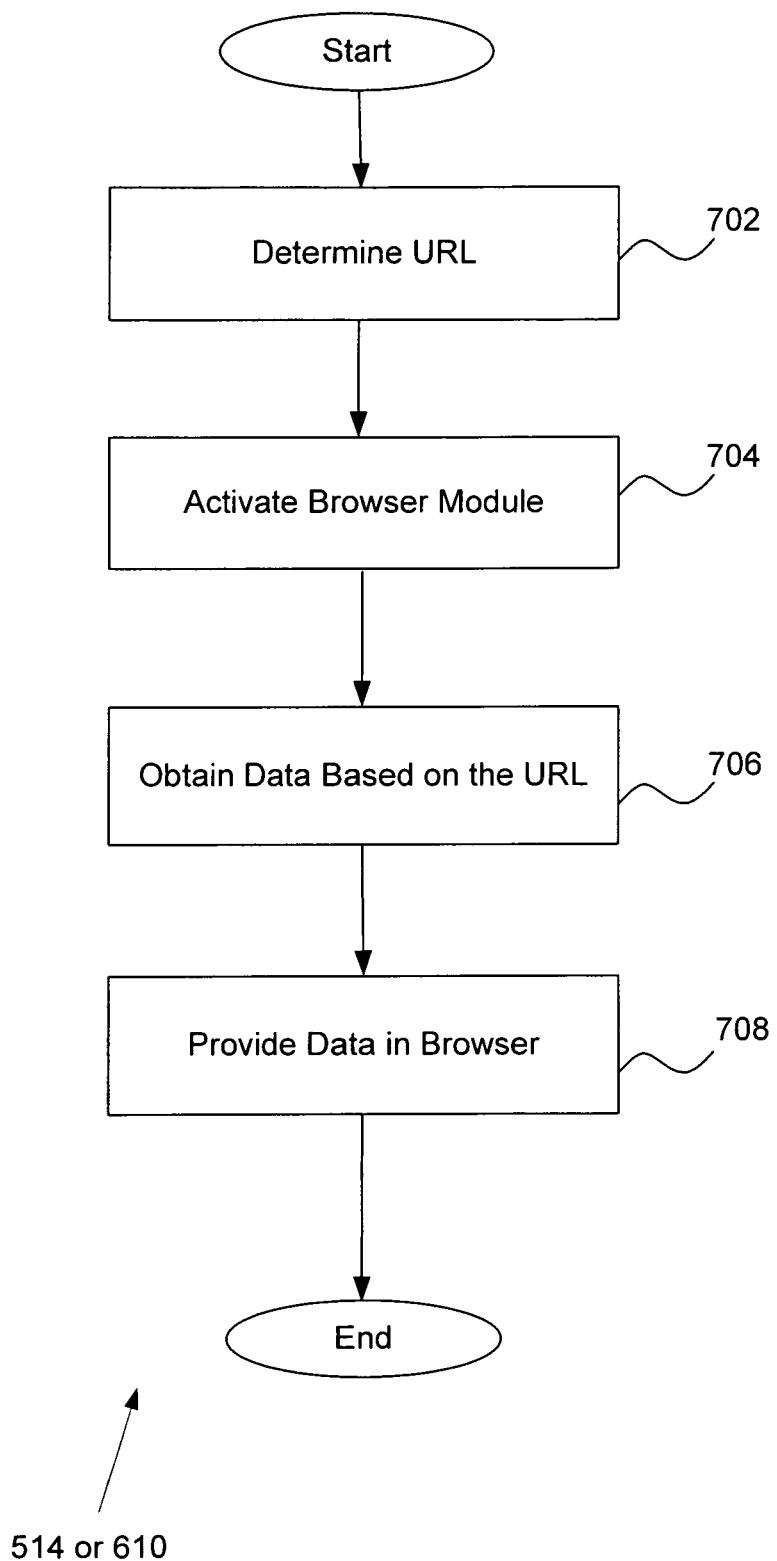
FIG. 7 is a flowchart of an exemplary method for launching the browser.

Referring now to FIG. 7, an exemplary flowchart for launching the browser (step 514 and step 610) is shown. In step 702, a URL associated with the communication data variable is determined. In exemplary embodiments, the browser launch settings indicate one or more URLs with embeddable fields to utilize. One or more of the communication data variables may be embedded into the fields to provide a dynamic data path to internal servers or the network 106.

For example, a URL with an embeddable field may be "Google.com%%caller_IDname%%." The communication data variable which may be embedded into the field is the caller identifier name. As such, the URL may direct access to a Google webpage with results of a search based on the caller's name. In some embodiments, the URL may comprise a private intranet address (e.g., the client database 310 or CRM server 122). It should be noted that the URL may include any uniform resource identifier (URI).

At the predetermined time, the browser module 312 is activated in step 704. Activation of the browser module 312 may cause a browser window to be displayed on the client device 112 of the individual. In some embodiments, one or more windows may be supplied via the browser module 312. Some of the data used to populate fields in the windows may already be known to the client device 112 and are used to populate fields (e.g., caller name and number, duration of a communication).

In step 706, data is retrieved from the determined URL from step 702. In some embodiments, the URL is directed to internal data sources and servers. For example, data may be retrieved from the CRM server 122 or a billing system. In other embodiments, the URL is directed data sources in the network 106 (e.g., Google.com).

In step 708, one or more windows of the browser may be populated with the retrieved data. In some embodiments, the retrieved data may be provided as a page within the window. In other embodiments, the retrieved data may be formatted to fit into various fields of the window. Alternative embodiments may contemplate other methods of displaying retrieved data.

FIG. 7 is exemplary. Alternative embodiments may contemplate more, fewer, or functionally equivalent steps or steps in a different order.

In an alternative embodiment, the functions of the present invention are all embodied within the client device 112. In these embodiments, the client device 112 is associated with an individual that is not apart of an enterprise. For example, the client device may be a home computer of the individual that is used for personal purposes. The individual may still desire to have additional information regarding a person placing an inbound communication or receiving an outbound communication. In this embodiment, the client device 112 will detect the communication data variable, initiate the communication, and will access the various data sources.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A method for event driven browser launch, comprising:
receiving one or more communication data variables associated with a communication with a first individual;

reviewing, via a module stored in a memory and running on a processor, browser launch settings for a second individual to determine a time to launch a browser; and launching the browser at the determined time, the browser providing to the second individual data retrieved from a URL associated with at least one of the communication data variables.

2. The method of claim 1 wherein launching the browser comprises automatically launching the browser before initiating the communication.

3. The method of claim 1 wherein launching the browser comprises automatically launching the browser after the communication has been initiated.

4. The method of claim 1 wherein launching the browser comprises automatically launching the browser upon completion of the communication.

5. The method of claim 1 wherein launching the browser comprises manually launching the browser.

6. The method of claim 1 further comprising detecting the one or more communication data variables.

7. The method of claim 1 further comprising determining that the second individual is to receive the communication and forwarding the communication data variable to a client device of the second individual.

8. The method of claim 1 further comprising determining the URL, whereby the URL comprises an embedded communication data variable.

9. The method of claim 1 wherein the URL is associated with a CRM system.

10. The method of claim 1 wherein the URL is associated with a billing system.

11. The method of claim 1 wherein the URL is associated with a network data source.

12. The method of claim 1 wherein launching the browser comprises displaying the retrieved data in at least one window of the browser.

13. The method of claim 1 wherein launching the browser comprises displaying one or more of the communication data variables in at least one window of the browser.

14. The method of claim 1 further comprising providing a policy which overrides one or more settings of the browser launch settings.

15. The method of claim 1 further comprising allowing modifications to utilize custom communication data variables.

16. A system for providing event driven browser launch, comprising:

a data module configured to receive communication data variables associated with a communication with a first individual;

a database configured to store browser launch settings for a second individual, the browser launch settings indicating a time to launch a browser; and a browser module, stored in a memory and running on a processor, the browser module configured to launch the browser at the determined time, the browser providing to the second individual data retrieved from a URL associated with at least one of the communication data variables.

17. The system of claim 16 wherein the data module comprises a communication data module configured to receive the communication data variables from a communication server and further configured to forward the communication data variables to a client device of the second individual.

18. The system of claim 16 wherein the data module comprises a client data module further configured to trigger a review of the browser launch settings.

19. The system of claim 16 further comprising an interface module configured to provide a settings interface, the settings interface allowing one of a third individual and the second individual to determine the browser launch settings.

20. A non-transitory machine readable medium having embodied thereon a program, the program providing instructions for a method for providing event driven browser launch, the method comprising:

receiving one or more communication data variables associated with a communication with a first individual;

reviewing browser launch settings for a second individual to determine a time to launch a browser; and launching the browser at the determined time, the browser providing to the second individual data retrieved from a URL associated with at least one of the communication data variables.

* * * * *